Patented Aug. 26, 1924.

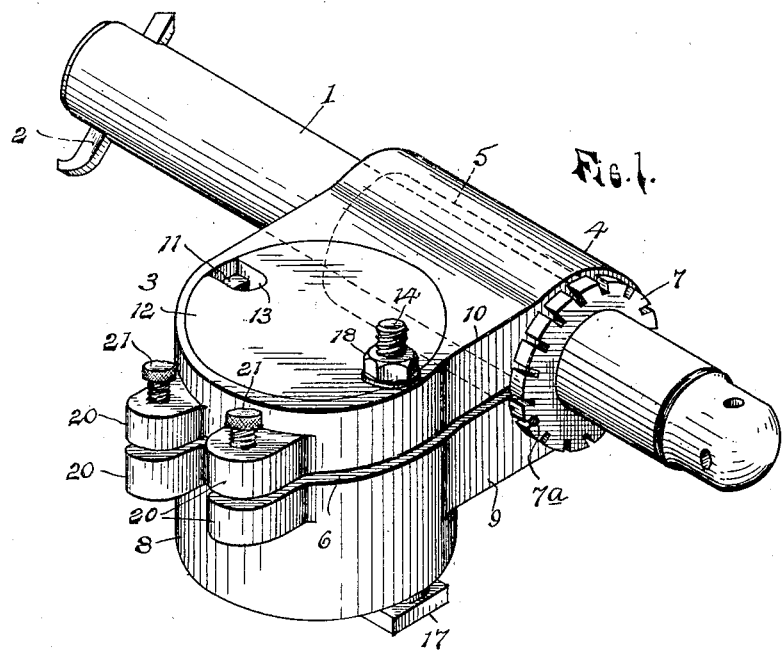
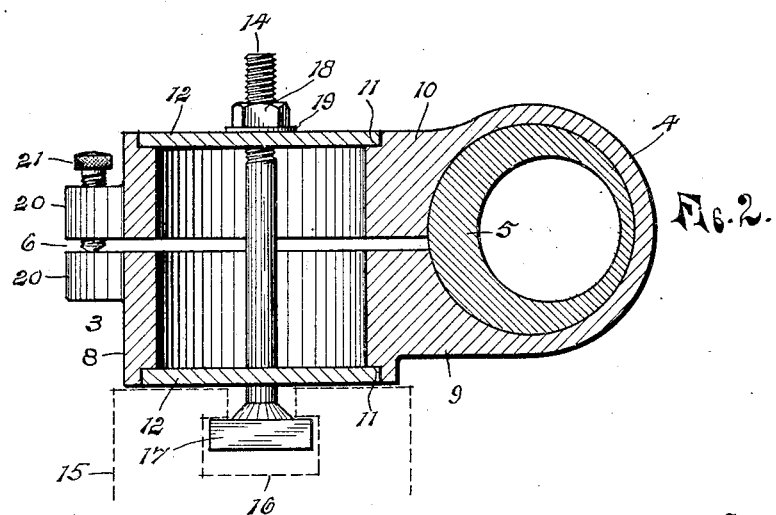

1,506,034

UNITED STATES PATENT OFFICE.

LUDWIG SWANSON, OF DETROIT, MICHIGAN.

BORING-TOOL HOLDER.

Application filed August 19, 1920. Serial No. 404,565.

*To all whom it may concern:*

Be it known that I, LUDWIG SWANSON, a citizen of the United States of America, residing at Detroit, in the county of Wayne and State of Michigan, have invented certain new and useful Improvements in Boring-Tool Holders, of which the following is a specification, reference being had therein to the accompanying drawings.

This invention relates to devices for adjustably holding boring bars and similar tools and its object is to provide simple means whereby a tool of this character may be rigidly held and quickly adjusted toward and from its support and angularly thereon. A further object is to provide a construction which is cheap to manufacture, and has other new and useful features, all as hereinafter more fully described.

With the foregoing and other ends in view, the invention consists in the matters hereinafter set forth and more particularly pointed out in the appended claims, reference being had to the accompanying drawing in which—

Figure 1 is a perspective view of a device illustrative of the invention; and

Fig. 2 a transverse section through the same.

In the drawings 1 indicates a boring bar or similar cutter holder which may have any desired construction, it being preferably cylindrical in form and carrying a cutting tool 2 at one end. This bar is mounted in a suitable holder or clamp, indicated as a whole at 3, which clamp comprises a horizontally split body having an eye 4 provided with a bore to receive a sleeve 5, the slit 6 which severs the body, extending into the bore of the eye at one side to divide or sever the eye so that the eye will yield to firmly clamp the sleeve which is preferably eccentric, that is the bore of the sleeve is off-center so that said sleeve is thicker at one side than at the other. The bar 1 fits closely in the bore of the sleeve and is secured firmly therein in any suitable manner to rotate therewith and one end of this eccentric sleeve is provided with a notched flange 7, the notches of which are adapted to be engaged by a suitable member such as a screw 7ª, tapped into the clamp body for holding the sleeve and bar against turning. By removing this screw the sleeve with the bar may be turned within the eye of the clamp and by reason of the eccentricity of the sleeve, the bar will be adjusted relative to the clamp.

The body 8 of the clamp comprises a member which is preferably of circular form bored out vertically to provide a hollow body with which the eye portion 4 of the clamp is connected by integral neck portions 9 and 10 at each side of the slit 6. At the upper and lower ends or faces of this cylindrical body 8, said ends are formed with annular grooves 11 forming seats for disks 12 which are free to turn in these seats. Each disk is provided with two diametrically opposed notches 13 in the opposite edges of the disks to receive clamping bolts 14 by means of which the clamp may be secured to the bed or table of a metal working machine to which the tool is adapted to be attached. This table or bed is indicated in dotted lines in Fig. 2 by the numeral 15 and is provided with an under-cut groove 16 to receive the squared heads 17 of the bolts. The upper ends of these bolts are screw-threaded and provided with a nut 18 and interposed between the nut and the upper disk 12 is a washer 19 which is of such diameter that a portion thereof will overlie the edge of the body 8 and the washer will cover the notch in the disk through which the bolt extends. The annular grooves 11 are of such a depth that the outer faces of the disks will lie in the plane of the ends of the body so that when the clamp is secured in place the lower end of the body and the lower disk will lie flat upon the table 15 and the washers 19 will lie flat upon the upper rim of the body and the upper disk. Therefore, by tightening the nuts 18 the clamp is securely held in place upon the table or bed and at the same time the two parts into which the clamp is divided by the slit 6 are drawn toward each other to firmly clamp the boring bar and its eccentric sleeve.

To prevent the divided parts of the body from being drawn by the bolts 14 toward each other with such force that the eye is liable to be broken before the heads of the bolts are drawn into sufficient contact with the groove in the table 15 to hold the clamp in place, the two parts of the body at each side of the slit 6 are formed with opposed ears 20 and the upper ears of the two pairs are provided with screw-threaded openings to receive set screws 21 which are adapted to engage the lower ears and prevent the two parts of the body from approaching each other, said set screws being adjustable to permit sufficient springing of the divided body to give the proper clamping effect upon the eccentric sleeve and prevent rotation of the boring bar under heavy strains.

By the arrangement of the clamping bolts 14 passing through the disks in the hollow body, said body may be freely rotated about the vertical axis of the bore of the body to adjust the boring bar to the work and these bolts form holding means for securely fastening the clamp to the machine bed, providing a much more rigid attachment than would be afforded by a single bolt passing through the axis of the body 8.

By providing the eccentric sleeve 5 or holder for the tool, which eccentric may be in the form of a sleeve, as shown or may be an integral part of the boring bar, said bar or tool may be adjusted relative to the clamp and by attaching the clamp to the machine bed in such a manner that it may be swung about a vertical axis, the clamp and tool may be readily adjusted about such center to bring the tool into proper relation with the work.

Obviously, other changes may be made in the form and construction of the clamp within the scope of the appended claims without departing from the spirit of my invention, and I do not, therefore, limit myself to the particular construction shown.

Having thus fully described my invention, what I claim is:—

1. A device of the character described comprising a hollow body with the opening in the body extending vertically therethrough, said body being formed with a laterally extending portion providing a tool holding eye with the axis of the eye extending at right angles to the opening through the body, and said body being divided horizontally with the dividing slit extending into the bore of the eye, a circular member seated within the body to permit rotation of the body relative thereto about a vertical axis, and a plurality of securing members extending through the circular member in spaced relation to secure said member against rotation upon a support.

2. A device of the character described including a hollow body provided with tool holding means, a circular member seated in said hollow body to hold said body in place thereon and to permit rotation of said body, and a plurality of spaced apart securing members, means passing through the circular member for holding said member against rotation and securing the same to a support.

3. A device of the character described, comprising a hollow body and laterally extending portion bored to form a tool receiving eye, said body being divided with the dividing slit extending into the bore of the eye, said body being also formed with annular seats at its ends, disks seated in said seats, and securing bolts passing through said disks and hollow body transversely of said slit.

4. A device of the character described comprising a hollow body divided horizontally and formed with a laterally extending split tool holding portion, a member rotatable relative to the body within the hollow upper portion thereof, and a plurality of securing members passing vertically through said member and hollow body for securing the body to a support.

5. A device as characterized in claim 4, wherein the upper and lower divided parts of the body are formed with projecting ears, the ear on one part being formed with a screw-threaded opening, and a set screw in said opening to engage the ear on the other part.

6. A device of the character described comprising a hollow body open at its upper and lower ends and formed with a laterally extending portion formed to receive a tool, said body being split horizontally into the laterally extending portion to clamp the tool therein upon the drawing of the divided portions of the body toward each other, said body being also formed at its ends with annular seats surrounding the openings in the ends of the body, disks seated in said seats, and securing bolts passing vertically through the hollow body and through said disks.

7. A device of the character described comprising a cylindrical shaped body having an integral laterally extending portion provided with a horizontal bore forming an eye to receive a tool, said body being split transversely with said split open into the bore of the eye to form a split clamping eye, said body being also formed with laterally extending ears on the divided portions of the body, the ear on one portion being formed with a screw-threaded opening to receive a set screw to engage the ear on the other portion, members seated in the ends of the cylindrical body and closing the same and adapted to rotate therein relative to the body, and headed securing bolts passing vertically through the bore of the cylinrical body and through said members to secure the body to a support and to provide means for drawing the divided parts of the body toward each other to clamp a tool in the tool holding eye.

In testimony whereof I affix my signature in presence of two witnesses.

LUDWIG SWANSON.

Witnesses:
    ANNA M. DORR,
    KARL H. BUTLER.